(No Model.)
C. A. PERKINS & W. H. H. NORCROSS.
OPERA GLASSES.
No. 446,611. Patented Feb. 17, 1891.
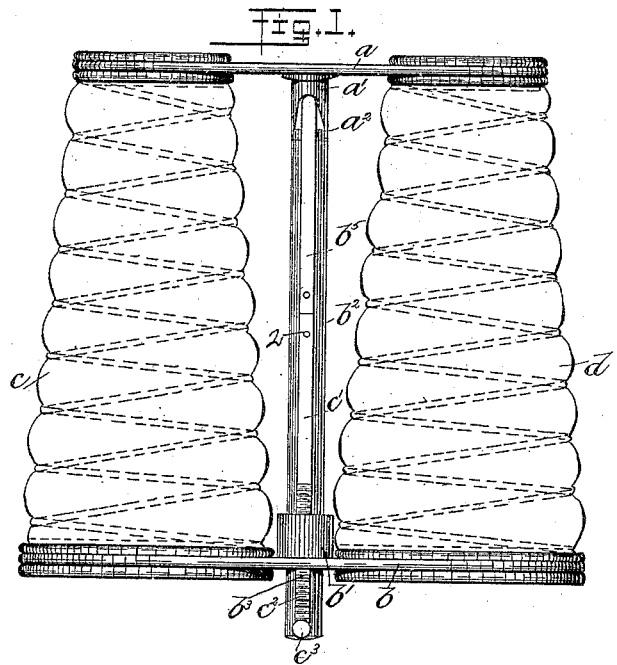
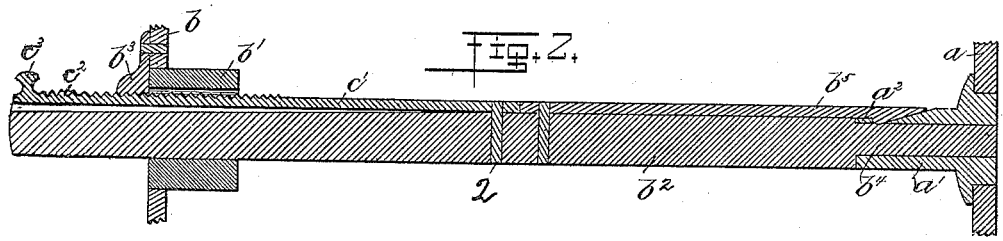

UNITED STATES PATENT OFFICE.

CHARLES A. PERKINS AND WILLIAM H. H. NORCROSS, OF BOSTON, MASSACHUSETTS, ASSIGNORS TO GEORGE H. EATON & CO., OF SAME PLACE.

OPERA-GLASSES.

SPECIFICATION forming part of Letters Patent No. 446,611, dated February 17, 1891.

Application filed May 15, 1890. Serial No. 351,908. (No model.)

*To all whom it may concern:*

Be it known that we, CHARLES A. PERKINS and WILLIAM H. H. NORCROSS, both of Boston, county of Suffolk, State of Massachusetts, have invented an Improvement in Opera-Glasses, of which the following description, in connection with the accompanying drawings, is a specification, like letters and figures on the drawings representing like parts.

This invention has for its object to improve the construction of collapsible opera-glasses, such as shown and described in United States Patent No. 381,347, dated April 17, 1888, granted to George H. Eaton.

The invention herein to be described comprehends a special form of locking and adjusting device for holding the parts in position for use and for adjusting the glasses.

Our invention consists in details of construction to be hereinafter specified and claimed.

Figure 1 shows in front elevation an opera-glass embodying this invention, the parts being in position for use; Fig. 2, an enlarged longitudinal section of the connecting rod or bar for the lens-holding plates, showing the locking and adjusting device.

The lens-holding plates $a$ $b$ and the collapsible barrels or cylinders $c$ $d$ are as shown in the said patent.

A socket $A'$ is formed on or attached to the lens-holding plate $a$, it having a notch formed on it exteriorly to present a shoulder or projection $a^2$.

A hole is made through the lens-holding plate $b$, into which, as herein shown, is fitted a short tube $b'$ for guiding and assisting in supporting the connecting rod or bar $b^2$.

A dog $b^3$ is secured to the lens-holding plate $b$ adjacent to the said hole made through it, it having a serrated acting face.

The connecting rod or bar, made of suitable length to connect the lens-holding plates in proper position one with relation to the other, is of suitable diameter to pass through the hole in the lens-holding plate $b$, and it has at its forward end a reduced portion $b^4$, which enters the socket $a'$.

The connecting rod or bar $b^2$ has secured to it a spring-acting latch $b^5$, which, when the rod or bar is pressed forward so that its reduced portion $b^4$ enters the socket $a'$, engages the shoulder or projection $a^2$ to hold the lens-holding plate $a$ in place on the rod or bar. A spring-acting bar $c'$ is also secured to the connecting rod or bar $b^2$ by means of a pin 2 or otherwise, the outer end of said bar $c'$ being free to yield slightly. The outer side of said spring-acting bar $c'$ has a serrated portion $c^2$, which is adapted to be engaged by the serrated faced dog $b^3$.

The spring-acting rod or bar $c'$ is provided at its outer end with a knob or projection $c^3$, to be engaged by the thumb or finger of the operator, pressure upon said knob or projection depressing the bar $c'$ against its own tension and disengaging the serrated portion $c^2$ from the serrated faced dog $b^3$. This serrated spring-acting bar $c'$ and the serrated faced dog $b^3$ constitute an adjusting device by which the lens-holding plates may be adjusted and held one with relation to the other.

To move one of the lens-holding plates toward or from the other, the spring-acting bar $c'$ is depressed, disengaging it from the serrated faced dog $b^3$. The connecting rod or bar $b^2$ will then be free to be moved through the hole in the lens-holding plate $b$, so that said lens-holding plate may be set in any desired position, and the pressure on said spring-acting bar $c'$ being then released it will return to its normal position, engaging the serrated faced dog $b^3$ and hold the said plates firmly in position.

We claim—

1. Opera-glasses having lens-holding plates and a connecting medium for such plates, one of such lens-holding plates having a socket $a'$ to receive the connecting medium, which socket is provided with a shouldered notch $a^2$, combined with a spring-latch $b^5$ on the connecting medium adapted to be engaged with and disengaged from the said shouldered notch, substantially as described.

2. Two lens-holding plates, one of which is provided with a serrated faced dog, combined with a connecting-bar having a spring-acting serrated faced bar, as $c'$, to co-operate with the said serrated faced dog, substantially as described.

In testimony whereof we have signed our names to this specification in the presence of two subscribing witnesses.

CHARLES A. PERKINS.
WILLIAM H. H. NORCROSS.

Witnesses:
BERNICE J. NOYES,
EMMA J. BENNETT.